Patented May 20, 1947

2,420,949

UNITED STATES PATENT OFFICE 2,420,949

CARBOXYALKYL CELLULOSE ETHER FIBERS AND FILMS OF GOOD WET STRENGTH

Onslow B. Hager, Glenside, and Louis H. Bock, Huntingdon Valley, Pa., assignors to Röhm & Haas Company, Philadelphia, Pa., a corporation of Delaware No Drawing. Application September 11, 1943, Serial No. 502,052

2 Claims. (Cl. 260—232)

This invention deals with a process for preparing filaments, ribbons, and films and other products from alkali-soluble carboxyalkyl cellulose ethers. More particularly, it deals with the preparation of extruded or cast objects from carboxyalkyl cellulose ether formed by passage through a shaping orifice of an alkaline solution thereof into an acid bath and treatment of the shaped, resulting product with a soluble zirconium salt.

Various carboxyalkyl celulose ethers are already known. For example, alkali-soluble cellulose alkali glycolate or carboxymethyl cellulose ether has been prepared by reaction of a haloacetate on alkali cellulose. More recently a method has been discovered for the preparation of alkali-soluble carboxyethyl cellulose ether by reaction of cellulose and acrylonitrile in the presence of a strong aqueous alkali, such as sodium hydroxide. Cf. application Serial No. 427,205, filed January 17, 1942, now United States Patent No. 2,349,797, issued May 30, 1944. It has been proposed to make filaments and unsupported films of these cellulose ethers by spinning their solutions into an acidic coagulating bath. The products thus obtained, however, have been lacking in wet strength and have suffered from other faults which it is now proposed to avoid or to correct.

It has been found that the alkali-soluble carboxyalkyl cellulose ethers may be converted into insoluble forms by extruding or passing a solution thereof from an orifice into an acidic bath which contains a zirconium salt in solution. Alternatively, the solution of alkali-soluble cellulose ether may be passed into an acidic bath wherein the cellulose ether is coagulated into a desired form and this form then treated with a separate solution of a zirconium salt. The resulting product is insoluble in water, solutions of alkalies, or solutions of acids.

The preferred type of alkali-soluble carboxyalkyl cellulose ether is the carboxyethyl cellulose ether prepared by reacting at 5° to 35° C. cellulose, a solution of a strongly basic, water-soluble hydroxide of 15% to 40% concentration, and acrylonitrile in an amount from 0.2 to 0.5 mol per glucose unit of the cellulose, as described in application Serial No. 427,205, filed January 17, 1942, now United States Patent No. 2,349,797, issued May 30, 1944. The product is soluble in 5% to 12% solutions of such hydroxides as sodium hydroxide, potassium hydroxide, or quaternary ammonium hydroxides, such as benzyl trimethyl ammonium hydroxide, dibenzyl dimethyl ammonium hydroxide, or tetramethyl ammonium hydroxide. Highly satisfactory solutions may be made in 6% to 10% aqueous solutions of sodium hydroxide, which is an economical and effective alkali. These alkaline solutions are readily made to contain 6% to 10% of cellulose. Solutions of about 8% cellulose are particularly useful in yielding fibers of good dry and good wet strengths.

In general, the same considerations hold for other alkali-soluble carboxyalkyl cellulose ethers, including carboxymethyl cellulose ethers, as for the above-described carboxyethyl cellulose ethers. Even within a type having a common carboxyalkyl group, however, there are minor differences, such as temperature of optimum solubility. For example, ethers may be prepared which are dissolved more readily in cold alkali solutions than in warm solutions. But this does not change the behavior of these ethers in this process, and the solutions may be satisfactorily used at temperatures somewhat above room temperatures (e. g., 30°–35° C.) or at 0° C. or lower.

The alkaline solutions of carboxyalkyl cellulose ethers may vary over a wide range of viscosity. Thus, solutions of 10 to 800 poises at about 20° C. may be used. The optimum range is about 100 to 200 poises.

The acid bath, into which the alkaline solution of carboxyalkyl cellulose ether is passed, should contain preferably from about 2% to about 20% of a water-soluble acid. When the coagulating bath contains both acid and a zirconium salt, the acid must be one giving soluble zirconium salts and one which allows precipitation of insoluble zirconium salts from the cellulose alkali glycolate or ether. The first requirement excludes phosphoric acid in the one-bath procedure, and the second dicarboxylic and hydroxy carboxylic acids. Such acids may be used in the coagulating bath only if they are thoroughly washed from the shaped mass and the zirconium solution is used in an after-treatment. There are preferably used such acids as hydrochloric, sulfuric, formic, or acetic. The latter may be used even above 20% concentration without deleterious effects. The other acids may also be used at such high strengths, but some loss in desirable properties of the final product may result. The acid baths may be used preferably at temperatures of 0° to 35° C., although spinning has been carried out with the bath approaching 60° C. with mechanical success.

It is highly desirable that the precipitating baths contain in addition to the acid moderate amounts of electrolytes, salts such as sodium or potassium sulfates or chlorides. With proper regard to the acid used and the added zirconium salt, if any, there may be used such salts as calcium chloride, zinc sulfate, or zinc chloride. The salts may be used at concentrations of 5% to 25%. In addition, non-electrolytes may be present, such as cane sugar or glucose, as in 2% to 10% concentrations.

As has been stated above, the precipitating or coagulating bath may contain a soluble zirconium salt. Such salts as zirconium or zirconyl chloride, sulfate, or nitrate may be used or double salts such as zirconyl sodium or ammonium sulfates, or, in fact, any zirconium salt which is soluble in the presence of a strong acid, including salts of carboxylic acids. Alternatively, these salts may be used in an after-treating bath. In either case, they may be used at concentrations equivalent to about ½% to about 2% of $ZrO_2$ in the bath. The optimum concentration of zirconium salts is one corresponding to about 1% of $ZrO_2$. While higher concentrations may be used, concentrations as high as 3% having been successfully used, the final products may then lack the dry strength which is obtained when the acid bath or after-treating bath contains zirconium in an amount equivalent to ½% to 2% of $ZrO_2$, the preferred range.

When the alkaline solution of the carboxyalkyl cellulose ether is passed into the acid bath, the ether is converted from an alkali salt to an ether acid which is insoluble in the coagulating bath. This acid is then converted to a still more insoluble zirconium salt. There is no intermediate plastic stage, such as occurs in the spinning of viscose. Nevertheless, the filaments, ribbons, or films formed in the coagulating bath may be stretched during the drying operation by being dried under tension, since there is otherwise considerable shrinkage during drying. The application of tension during drying leads to a product of improved strength.

The filaments, ribbons, or films of the acid form of the cellulose ether, although insoluble in water or acid solutions, are, nevertheless, sensitive thereto and lack wet strength. They are, of course, highly sensitive to alkaline solutions. These deficiencies are overcome when the acid form is converted in part to a zirconium carboxylate. Although other metals are capable of yielding insoluble cellulose ether salts, zirconium imparts effects, particularly as to wet strength, which are not possible with these other metals. This point is illustrated by the following example.

*Example 1*

A series of baths was prepared, each to contain 15% of sodium sulfate and 5% of glucose. Where heavy metal sulfates were involved, sulfuric acid at 10% was used. Then to individual baths there were added, respectively, 1.5% of copper sulfate, 1% of zinc sulfate, 2% of aluminum sulfate, and 6% of a 12½% zirconyl sulfate solution. To another bath was added 1.7% of mercuric chloride and 7.2% of hydrogen chloride. Another bath was adjusted to a content of 4.3% of thorium nitrate, $Th(NO_3)_4.12H_2O$, and 9.1% of nitric acid. A solution of an alkali-soluble carboxyalkyl cellulose ether was then spun into these baths. The resulting filaments were washed and dried all under the same conditions. Wet strengths were determined for the various filaments as follows:

| Metal in Bath | Wet Strength |
| --- | --- |
| Zr | 1.56 |
| Zn | .87 |
| Al | .60 |
| Cu | .33 |
| Hg | .49 |
| Th | .22 |

Wet strengths are given in terms of kilograms per square millimeter as averages of a number of determination. The filaments with the exception of that treated with thorium, which was definitely lower, had about the same dry strengths.

The preparation of filaments, ribbons, and films is further illustrated by the following detailed examples:

*Example 2*

A solution was prepared at room temperature to contain 8% of sodium hydroxide and 8% of an alkali-soluble carboxyethyl cellulose ether. The solution was deaerated under reduced pressure and then fed under a pressure of 20 to 25 pounds per square inch into a metering pump which delivered 7.5 milliliters of solution per minute. The solution was forced through a slot, 0.100" x 0.010", in a platinum-iridium thimble into a bath having the following composition:

| | Parts |
| --- | --- |
| Sulfuric acid | 132 |
| Zirconium as $ZrO_2$ | 10 |
| Sodium sulfate | 100 |
| Glucose | 50 |
| Water | 708 |
| | 1000 |

The ribbon from the slot was led through thirty-one inches of precipitating bath at a rate of 334 inches per minute and over a godet wheel of 16" circumference. From the wheel the ribbon dropped into a precipitating bath of the same composition as above and remained in this bath for about ten minutes. The ribbon was then washed in water for two hours and finally dried under a 20-gram tension. The final dimensions of the ribbon were 0.031" x 0.0031". The dry strength was 11.4 kilograms per square millimeter and the wet strength 2.32 kilograms per square millimeter. Some filament was made with the same materials, but the drying was done without tension. Strengths were then found as follows: dry, 5.8 kilograms per square millimeter, and wet, 1.3 kilograms per square millimeter.

*Example 3*

A solution containing 8% of an alkali-soluble carboxyethyl cellulose ether and 8% of sodium hydroxide was prepared and spun as above, except that the slot was replaced by a conventional rayon spinneret having eighty round holes of 0.003" diameter. The precipitating bath had the following composition:

| | Parts |
| --- | --- |
| Sulfuric acid | 220 |
| Zirconium as $ZrO_2$ | 12 |
| Sodium sulfate | 80 |
| Glucose | 50 |
| Water | 638 |
| | 1000 |

As the yarn was formed, it was led through twenty inches of precipitating bath at a rate of 875 inches per minute, over a godet wheel, and into running water. The yarn was dried under a 20-gram tension. The resulting yarn had the following properties:

| | |
| --- | --- |
| Denier | 378 |
| Density | 1.70 |
| Tensile strength, dry_grams per denier | 1.05 |
| Tensile strength, wet_____do____ | 0.330 |

The strengths correspond to 16 and 5 kilograms per square millimeter, respectively.

Example 4

It was found that when films, ribbons, or filaments are spun into an acid bath, washed, and dried, and then treated in a separate bath containing zirconium, they may be stretched somewhat more during the first drying step than comparable films, ribbons, or filaments treated in a single bath with both acid and zirconium salt. The films made by the two-bath process had tensile strengths averaging 15 kilograms per square millimeter, whereas films from the same materials had strengths of 11 to 12 kilograms per square millimeter by the one-bath process.

The shaped masses treated with an acid and a zirconium salt contain zirconium attached to the carboxy groups. Analysis of ribbons treated with solutions containing 0.275% to 2.75% of $ZrO_2$ established that the zirconia content of the resulting ribbon was approximately proportional to the concentration of the zirconia in the bath, varying from 1.56% to 13.30%. Use of treating solutions containing ½% or more of zirconia ensured good wet strength, even at the highest zirconia contents. On the other hand, dry strength tended to fall off when the treating solutions contained over about 2% of zirconia, and imparted over 9% of zirconia to the shaped ribbon. When the zirconia content of the ribbons was between about 3% and about 9%, both wet and dry strengths were highly satisfactory.

The use of alkali-soluble carboxyalkyl cellulose ethers is now made practical for the formation of filaments, ribbons, films, and other objects which may be extruded or cast, coagulated in an acid bath, and treated with a solution of a zirconium compound. The alkali solutions of these ethers present no problems in regard to aging such as are encountered with viscose solutions. They have as a further advantage thereover the fact that no sulfur and sulfur compounds are formed during the preparation, with the attendant problems of removal.

We claim:

1. Shaped cellulosic products in the form of filaments, ribbons, and unsupported films which have good wet strength, which are insoluble in water, in solutions of alkalies, and in solutions of acids, which consist of carboxyalkyl cellulose ether, the free acid form of which is soluble in excess alkali solution, and which contain zirconium attached to carboxyalkyl groups of the cellulose ether in an amount equivalent to about 3% to about 9% of $ZrO_2$.

2. Shaped cellulosic products in the form of filaments, ribbons, and unsupported films which have both good dry and good wet strengths, which are insoluble in water, aqueous alkali solutions, and solutions of acids, which consist of carboxyethyl cellulose ether, the free acid form of which is soluble in excess alkali solution, and which contain zirconium attached to carboxyethyl groups of the cellulose ether in an amount equivalent to about 3% to about 9% of $ZrO_2$.

ONSLOW B. HAGER.
LOUIS H. BOCK.

REFERENCES CITED

The following references are of record in the file of this patent:

UNITED STATES PATENTS

| Number | Name | Date |
|---|---|---|
| 2,317,492 | Speakman et al. | Apr. 27, 1943 |
| 2,179,457 | Voss | Nov. 7, 1939 |
| 2,180,152 | Kohler | Nov. 14, 1939 |
| 2,332,048 | Bock et al. | Oct. 19, 1943 |
| 2,331,858 | Freeman et al. | Oct. 12, 1943 |
| 2,087,237 | Bolton | July 20, 1937 |
| 2,236,545 | Maxwell et al. | Apr. 1, 1941 |
| 2,060,056 | Ellsworth | Nov. 10, 1936 |
| 2,171,222 | Meyer | Aug. 29, 1939 |
| 2,331,859 | Roberts | Oct. 12, 1943 |
| 1,682,293 | Lillienfeld | Aug. 28, 1928 |

FOREIGN PATENTS

| Number | Country | Date |
|---|---|---|
| 516,634 | Great Britain | Jan. 8, 1940 |